Figure 1:
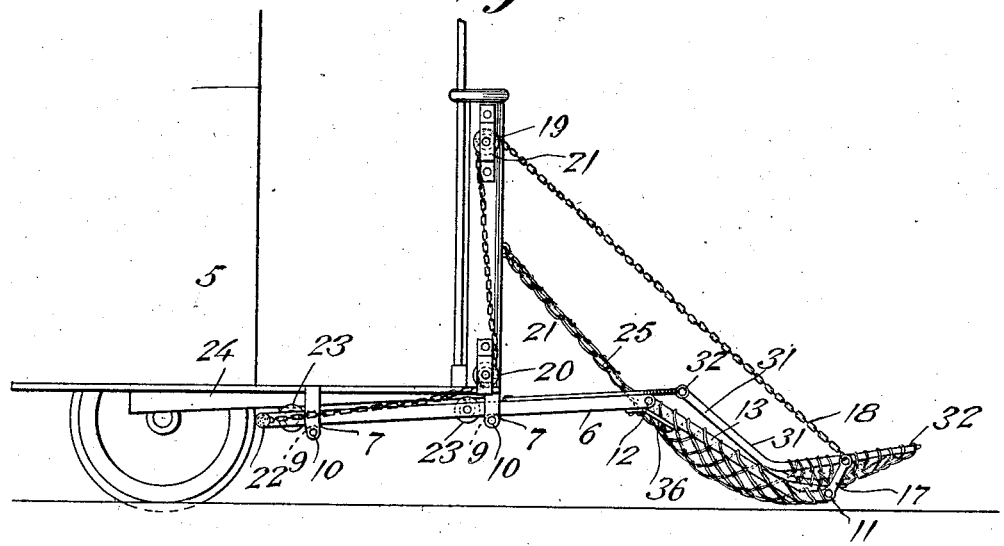

A. SAGRAMOSO.
VEHICLE FENDER.
APPLICATION FILED JUNE 8, 1911.

1,021,630.

Patented Mar. 26, 1912.

2 SHEETS—SHEET 1.

Witnesses

Inventor
Alfonso Sagramoso
By Victor J. Evans
Attorney

A. SAGRAMOSO.
VEHICLE FENDER.
APPLICATION FILED JUNE 8, 1911.

1,021,630.

Patented Mar. 26, 1912.

2 SHEETS—SHEET 2.

Inventor
Alfonso Sagramoso

Witnesses

By Victor J. Evans
Attorney.

UNITED STATES PATENT OFFICE.

ALFONSO SAGRAMOSO, OF PHILADELPHIA, PENNSYLVANIA.

VEHICLE-FENDER.

1,021,630. Specification of Letters Patent. Patented Mar. 26, 1912.

Application filed June 8, 1911. Serial No. 632,012.

*To all whom it may concern:*

Be it known that I, ALFONSO SAGRAMOSO, a citizen of Italy, residing at Philadelphia, in the county of Philadelphia and State of Pennsylvania, have invented new and useful Improvements in Vehicle-Fenders, of which the following is a specification.

The invention relates to fenders, and more particularly to the class of safety fenders for use on cars, automobiles, locomotives, or the like.

The primary object of the invention is the provision of a fender in which the catch net thereof will be automatically lifted on the contacting of the fender with an object positioned within the path of travel of the moving vehicle, so as to pick up such object and avoid the possibility of the vehicle running onto or over such object during its travel.

Another object of the invention is the provision of a fender in which an object when caught therein will be prevented from falling out of the same from any side thereof, thereby avoiding the possibility of injury to the object while a vehicle is in motion.

A further object of the invention is the provision of a fender wherein the catch net is normally disposed so as to positively receive an object in the path of a moving vehicle, and will automatically become elevated, so as to lift such object above the ground surface and prevent any possibility of the object falling from the fender; thus, in this manner, the loss of life and limb is avoided which ordinarily results from being run over or struck by a moving vehicle.

A still further object of the invention is the provision of a fender in which the catch net or basket thereof is positioned upon a vehicle on a level, so as to assure the falling of an object in the path of movement of the vehicle into the net or basket, thereby avoiding injury to the same, and preventing the possibility of the crushing of the object by the vehicle wheels or being struck by the latter.

A still further object of the invention is the provision of a fender which is positive in action, so as to protect a pedestrian or object located in the path of movement of a vehicle and to avoid the possibility of injury to such pedestrian or object when upon the track.

A still further object of the invention is the provision of a fender which possesses superior advantages in point of simplicity, durability, and general efficiency, and also capable of being mounted upon various styles of vehicles, and that may be manufactured at a minimum cost.

In the drawings, accompanying and forming part of the specification, is illustrated the preferred form of embodiment of the invention, which, to enable those skilled in the art to carry the invention into practice will be set forth at length in the following description, while the novelty of the invention will be pointed out in the hereunto appended claims.

Figure 2:
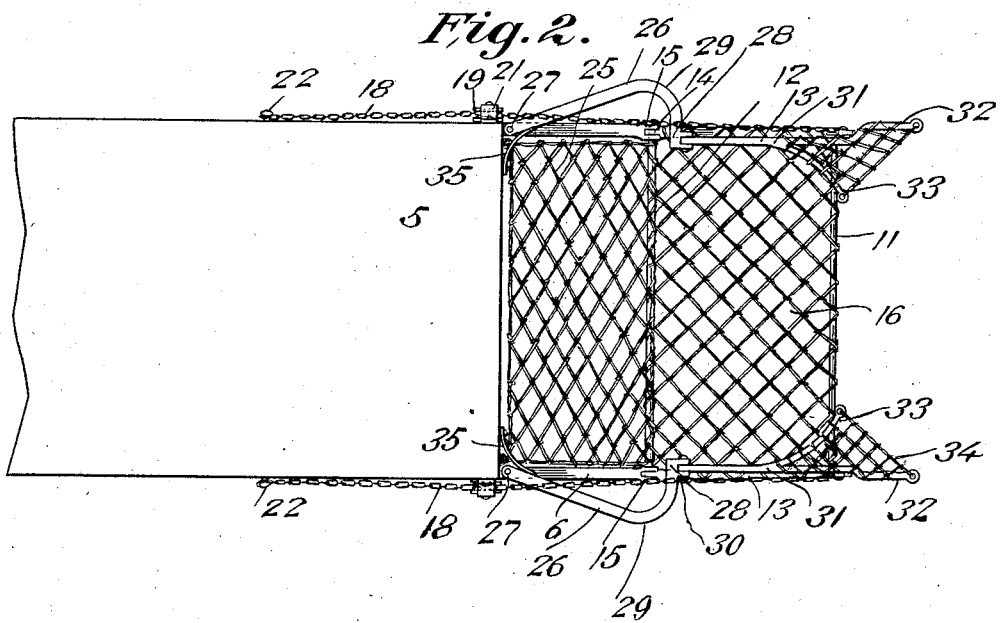
Figure 3:
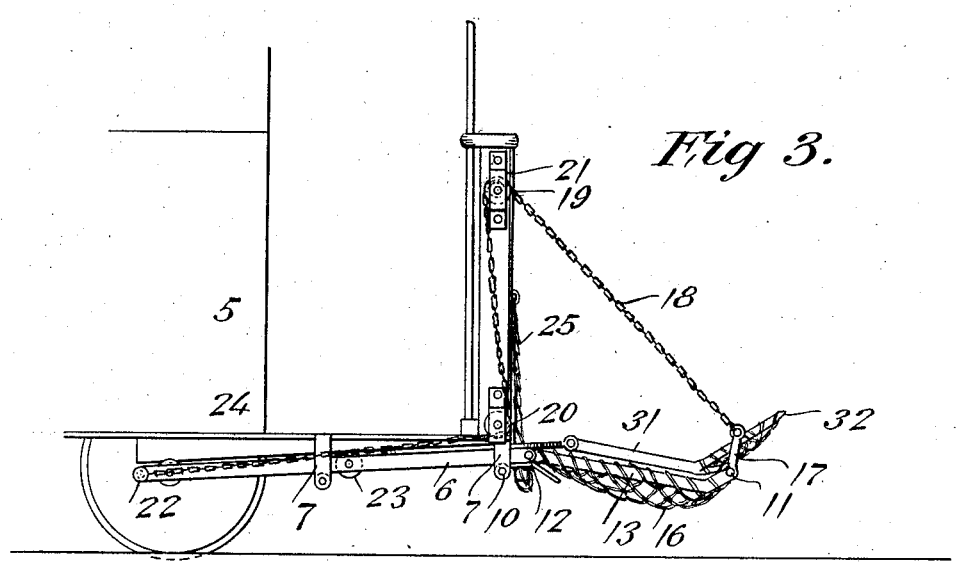
Figure 4:
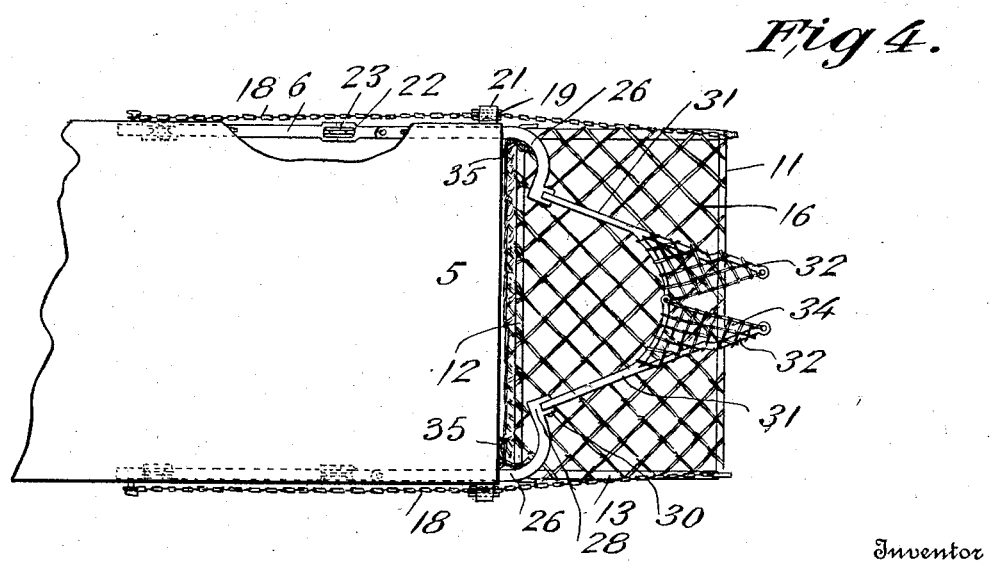

In the drawings: Figure 1 is a fragmentary side elevation of a car, showing the fender constructed in accordance with the invention mounted thereon. Fig. 2 is a top plan view thereof. Fig. 3 is a view similar to Fig. 1, showing the fender in raised position, for holding an object caught therein. Fig. 4 is a top plan view thereof.

Similar reference characters indicate corresponding parts throughout the several views of the drawings.

Referring to the drawings by numerals, 5 designates generally a portion of a car body, which is of the ordinary well-known construction, mounted upon the car wheels, as usual, and at the forward end of the car body is supported the fender, hereinafter more fully described.

The fender comprises displaceable side supporting arms 6, the latter being passed through inverted U-shaped front and rear brackets or yokes 7 fixed to the under face of the bottom or platform of the car body 5 in spaced relation to each other, adjacent opposite longitudinal side edges of the said car body, the yokes or brackets being fitted with anti-friction rollers 9 journaled therein upon stud spindles 10 fixed within the said yokes, and upon these rollers are adapted to travel the displaceable arms 6 which carry at their outer ends a catch net or basket, presently described.

The catch net or basket comprises a substantially rectangular-shaped frame, including front and rear bars 11 and 12, and side bars 13, the latter being formed at their rear ends with perforated ears 14, engaging in forks 15 formed at the outer ends of the supporting bars 6, the rear bar 12 of the frame being passed through the forks 15 and ears 14, thus connecting the same and serving as a pivot for the frame. Connected with the front, rear and side bars 11, 12 and 13 of the frame is a net or foraminous body 16, the same being slightly slackened, and in which is adapted to be caught a pedestrian or object when in the path of travel of the car.

Formed on the forward ends of the side bars 13 of the catch net or basket frame are forwardly and upwardly extending hanger arms 17, to which are connected the forward ends of chains 18, which latter are trained over upper and lower guide rollers 19 and 20, respectively, the latter being journaled in brackets 21 suitably fixed to the sides of the car body 5, the rear ends of the chains 18 being connected to laterally extending lugs 22 formed on the rear ends of the supporting bars 6, so that when the latter are moved in a rearward direction on the car body, the catch net or basket frame will automatically elevate from normally lowered position, shown in Fig. 1, to the position shown in Fig. 3 of the drawings, thereby catching and holding the pedestrian or object in the net or basket at an elevated point of safety above the ground surface.

Formed in the supporting arms 6 are spaced elongated slots 22, in which are journaled peripherally grooved friction rollers 23, the same contacting with and adapted to travel upon rearwardly inclined guide rail tracks or flanges 24 fixed to and depending from the bottom or platform of the car body 5 in alinement with the supporting arms 6, so that the latter will be caused to lower at their rear ends, while their front ends will become elevated on movement thereof rearwardly of the car body, thereby assisting in the elevation of the catch net or basket, when the frame thereof strikes a pedestrian or object in the path of travel of the car.

Connected with the rear bar 12 of the net or basket frame is a guard net 25, which latter is also connected to the front of the car body 5 at a point elevated above its point of connection with the catch net or basket frame, and is designed to prevent the pedestrian or object caught within the basket or net from falling out of the same between it, rearwardly thereof, and the car body, as will be obvious.

Carried by the supporting arms 6 are inwardly swinging side guard supporting arms 26, the rear ends of which are connected to the supporting arms 6 by means of pivots 27 which are spaced rearwardly from the outer forks 15 of the said supporting arms 6, the side guard supporting arms 26 being provided with inwardly curved forward ends 28, forming outer cam edges 29 adapted to contact with the forward brackets or yokes 7 on movement of the supporting arms 6, rearwardly of the car body 5 for the bringing of said side guard supporting arms 26 toward each other, and in this manner closing the side safety guards, presently described.

The inwardly curved forward ends 28 of the side guard supporting arms 26 are provided with forwardly directed forks 30, in which are hinged the side guards, comprising parallel raising and lowering limbs 31, the same being connected in the forks 30 by means of pivots 32 engaged in the rear ends thereof, the limbs 31 being formed with upwardly bent and forwardly converging branch extensions 32 and 33, respectively, to which are connected guard nets 34, the limbs 31 being caused to approach each other above the catch net or basket, when the arms 29 move inwardly and the supporting bars 6 are displaced rearwardly of the car body, or in a reverse direction to the travel thereof, so that the guard nets 34 will be positioned in forwardly converging relation to each other on opposite sides of the object or pedestrian caught in the catch net or basket, and thereby preventing such object or pedestrian from falling out of the same laterally to opposite sides thereof. When the catch net or basket is being set or moved to normally lowered position, as shown in Fig. 1, the limbs 31 of the side guards will gravitate onto the catch basket or net into the position shown in Figs. 1 and 2 of the drawings.

Fixed to the front end of the car body 5, adjacent to the side guard supporting arms 26, are leaf springs 35, the free ends of which contact with the said arms 26 and are designed to move them outwardly when the catch net or basket is moved to normal position, shown in Figs. 1 and 2, thereby separating the side guards, so that the branch extensions 32 will contact with the hangers 17 on the frame supporting the catch net or basket, and when the side guards are in this position, the object or pedestrian will be deflected centrally within the catch net or basket, as will be apparent.

Fixed to the outer forked ends 15 of the catch net supporting bars 6 are forwardly inclined rest pieces 36, against which contact side bars 13 of the catch net frame or basket, when in normally lowered position, so as to limit the forward inclination of the said catch net or basket, when in such position.

From the foregoing, taken in connection with the accompanying drawings, it is thought that the construction and operation of the invention will be readily understood, without requiring a more extended explanation.

What is claimed is:

1. The combination with a vehicle body, of a fender comprising supporting members movably connected to the forward end of the said body, a normally lowered catch net frame pivotally connected to the forward ends of said members, rearwardly inclined tracks fixed to the bottom of the said car body, rollers carried by the members and movable upon the tracks, upper and lower guide means carried by the body, and distorted flexible connections trained over the guide means and united with the rear ends of the members and said catch net frame for automatically elevating the latter on the movement of the members in one direction.

2. The combination with a vehicle body, of a fender comprising supporting members movably connected to the forward end of the said body, a normally lowered catch net frame pivotally connected to the forward ends of said members, rearwardly inclined tracks fixed to the bottom of the said body, rollers carried by the members and movable upon the tracks, upper and lower guide means carried by the body, distorted flexible connections trained over the guide means and united with the rear ends of the members and said catch net frame for automatically elevating the latter on the movement of the members in one direction, and guide yokes depending from the bottom of the vehicle body and receiving the said members for holding the same in alinement with the tracks.

3. The combination with a vehicle body, of a fender comprising supporting members movably connected to the forward end of the said body, a normally lowered catch net frame pivotally connected to the forward ends of said members, rearwardly inclined tracks fixed to the bottom of the said body, rollers carried by the members and movable upon the tracks, upper and lower guide means carried by the body, distorted flexible connections trained over the guide means and united with the rear ends of the members and said catch net frame for automatically elevating the latter on the movement of the members in one direction, guide yokes depending from the bottom of the vehicle body and receiving the said members for holding the same in alinement with the tracks, and means on the members serving as rests for the catch net frame when in normally lowered position.

4. The combination with a vehicle body, of a fender, comprising supporting members movably connected to the forward end of the said body, a normally lowered catch net frame pivotally connected to the forward ends of said members, rearwardly inclined tracks fixed to the bottom of the said body, rollers carried by the members and movable upon the tracks, upper and lower guide means carried by the body, distorted flexible connections trained over the guide means and united with the rear ends of the members and said catch net frame for automatically elevating the latter on the movement of the members in one direction, guide yokes depending from the bottom of the vehicle body and receiving the said members for holding the same in alinement with the tracks, means on the members serving as rests for the catch net frame when in normally lowered position, and side guards connected and coöperative with the members when moving in one direction for the bringing of said guards into forwardly converging relation to each other above the catch net frame.

5. The combination with a vehicle body, of a fender, comprising supporting members movably connected to the forward end of the said body, a normally lowered catch net frame pivotally connected to the forward ends of said members, rearwardly inclined tracks fixed to the bottom of the said body, rollers carried by the members and movable upon the tracks, upper and lower guide means carried by the body, distorted flexible connections trained over the guide means and united with the rear ends of the members and said catch net frame for automatically elevating the latter on the movement of the members in one direction, guide yokes depending from the bottom of the vehicle body and receiving the said members for holding the same in alinement with the tracks, means on the members serving as rests for the catch net frame when in normally lowered position, side guards connected and coöperative with the members when moving in one direction for the bringing of said guards into forwardly converging relation to each other above the catch net frame, and means for normally separating the side guards.

6. The combination with a vehicle body, of a fender, comprising supporting members movably connected to the forward end of the said body, a normally lowered catch net frame pivotally connected to the forward ends of said members, rearwardly inclined tracks fixed to the bottom of the said body, rollers carried by the members and movable upon the tracks, upper and lower guide means carried by the body, distorted flexible connections trained over the guide means and united with the rear ends of the members and said catch net frame for automatically elevating the latter on the movement of the members in one direction, guide yokes depending from the bottom of the vehicle body and receiving the said members for holding the same in alinement with the tracks, means on the members serving as rests for the catch net frame when in normally lowered position, side guards connected and coöperative with the members when moving in one direction for the bringing of said guards into forwardly converging relation to each other above the catch net frame, means for normally separating the side guards, and a safety net connected with the rear end of the catch net frame and the vehicle body.

In testimony whereof I affix my signature in presence of two witnesses.

ALFONSO SAGRAMOSO.

Witnesses:
FRANK O. PARKER,
BENNETT S. JONES.

Copies of this patent may be obtained for five cents each, by addressing the "Commissioner of Patents, Washington, D. C."